July 12, 1932.  A. V. AASTRUP  1,867,243

MACHINE FOR KNEADING DOUGH, WHIPPING, AND SIMILAR PURPOSES

Filed Aug. 11, 1930

A. V. Aastrup
INVENTOR

By  Marks & Clerc
Attys.

Patented July 12, 1932

1,867,243

UNITED STATES PATENT OFFICE

AXEL VALDEMAR AASTRUP, OF BELINSKA VILLAN, SWEDEN

MACHINE FOR KNEADING DOUGH, WHIPPING, AND SIMILAR PURPOSES

Application filed August 11, 1930, Serial No. 474,503, and in Germany November 22, 1929.

This invention relates to a machine for kneading dough, working forcement, whipping and similar operations, which is so arranged, that two or more vessels of different widths may be mounted respectively in the same machine, while the same effective working of the goods along the inner side of the vessels is effected by implements carried by a single driving spindle for the same. This is rendered possible through the provision in the base plate of the machine of two or more carriers or supporting means for the vessels respectively, which means are located laterally of and at a distance from one another adapted to the difference in the widths of the vessels. One or more of the said supporting means is fixed, while the other means is rotatable and may consist of a spindle rotated by the main shaft of the machine through a suitable gearing.

In the accompanying drawing a machine arranged in accordance with the invention is shown as an example, said machine being adapted to two vessels of different widths.

Figure 1:
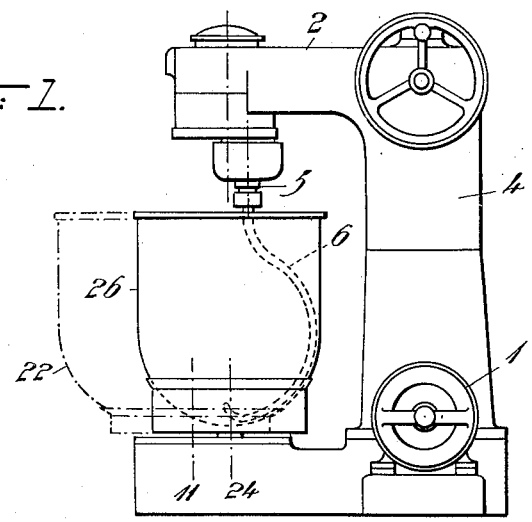
Figure 2:
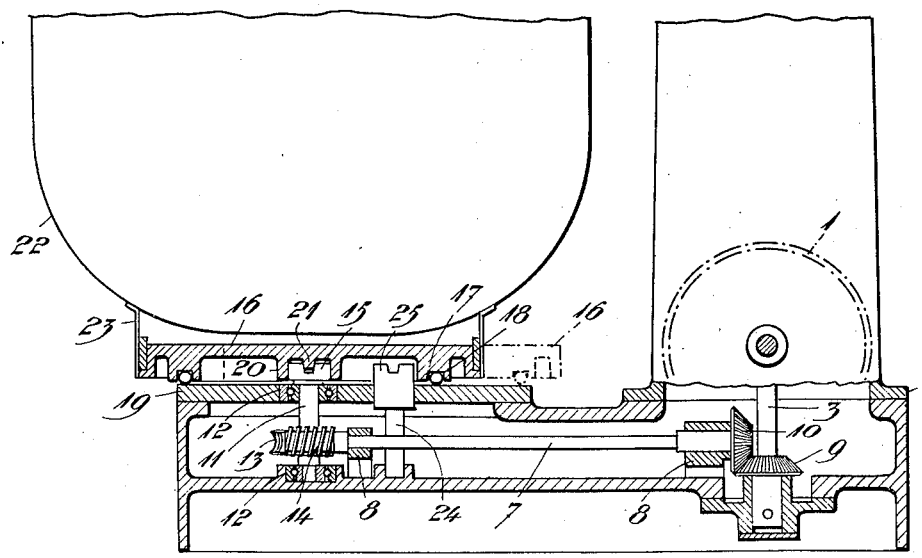

Figure 1 is a side view of the machine and Figure 2 shows in a vertical section the base plate of the machine together with the supports for the vessels and the driving mechanism for one of the said supports.

The machine shown in the drawing is driven by an electric motor 1, from which motion is transmitted to a sun and planet gear system located in the head 2 of the machine by means of a vertical shaft 3 journalled in the pillar 4 and a horizontal shaft journalled in the said head. The said shafts together with the gears transmitting motion from the electric motor, and between the shafts and to the sun and planet gear system may be of any known or suitable construction and for that reason are not shown. The sun and planet gear system, which may be of the known type, carries the spindle 5 of the implement 6, to which a rotary and circling motion is imparted by the gear. A shaft 7 is journalled in bearings 8, provided in the base of the machine, and is rotated by the shaft 3 by means of a mitre gearing 9, 10. A short, vertical spindle 11 is journalled for instance in ball bearings 12 in the base and is provided with a worm wheel 13, meshing with a worm 14 provided on the shaft 7, so that a rotary motion is imparted to the spindle 11, as the machine operates. The said spindle 11 has a fork-shaped head 15. 16 is a disc, which in the form of execution shown is provided with a circular groove 17 in its bottom side, in which balls 18 are located running on the table 19 of the machine. The said disc 16 has a central circular flange 20, adapted to engage the head 15 of the spindle 11 and to centre the disc 16, and also a central flat projection 21 adapted to engage the groove of the head 15, as shown, so that the disc 16 will rotate with the spindle 11. 22 is a vessel adapted to contain goods to be treated. The said vessel is provided at its lower side with a reinforcing flange 23, which is forced on the disc 16 thus connecting the disc and the vessel. 24 is a short spindle which is fixed in the base of the machine, so that it is unable to rotate. The said spindle 24 has a fork-shaped head 25, similar to the head 15, so that the disc 16 may be mounted on the spindle 24 and locked in its position, as shown by dotted lines in Figure 2. A vessel 26 of less width is arranged in the same manner as the vessel 22, so that it may be slid on the disc 16 and locked to the same.

The provision of the two spindles renders possible the mounting of two vessels of different widths in the machine. Figure 1 shows by full lines the smaller vessel 26, locked to the stationary spindle 24. The wider vessel 22 is shown by dotted lines. The centre line of the spindle 24 is coaxial to the axis round which the spindle 5 together with the implement 8 circles and the width of the vessel 26 is so adapted, that the implement 6 works the goods along the inner side of the wall of the vessel and close to the same, the most effective working being thereby gained. As the wider vessel 22 should be used, the disc 16 is mounted on the rotatable spindle 11 and the vessel 22 then placed on the disc. The distance of the centre line of the spindle 11 from the axis round which the implement circles is so adapted that also in this case the implement works the goods along the inner side of the vessel 22 and close to the same, while the vessel 22 is rotated through the motion transmitting mechanism described above and shown in Figure 2. The implement may be so arranged, that it works also the portions of the goods which are located at the centre of the vessel 22, so that no part of the goods is left untouched.

Consequently, through the provision of two supporting means, one being fixed and the other rotatable, it is possible to mount in the machine two vessels of different widths, while a single driving spindle for the implements is sufficient. This is an advantage, because hereby the procuring of machines arranged for each of the vessels may be dispensed with. Owing to the fact that only one driving spindle for the implements and for one of the vessels are necessary, the construction of the machine is simplified and the machine may be manufactured at low cost. The machine may, obviously, be provided with a third rotatable spindle for a still wider vessel. Instead of a rotating and circling motion being imparted to the implement the driving mechanism of the spindle carrying the implement may be such, that the implement only rotates.

I claim:

In a machine for kneading dough, whipping and similar purposes, the combination of a rotating, working implement carrying spindle, a plurality of carriers for vessels of different widths, the carrier for the vessel of the slightest width being fixed and located nearest to the said spindle and so that the implement thoroughly works the goods in the same, and the other carrier being rotatable and located laterally of the fixed carrier at a distance adapted to the difference of the widths of the vessels, and a driving mechanism for the rotatable carrier.

In testimony whereof I have hereunto affixed my signature.

AXEL VALDEMAR AASTRUP.